UNITED STATES PATENT OFFICE.

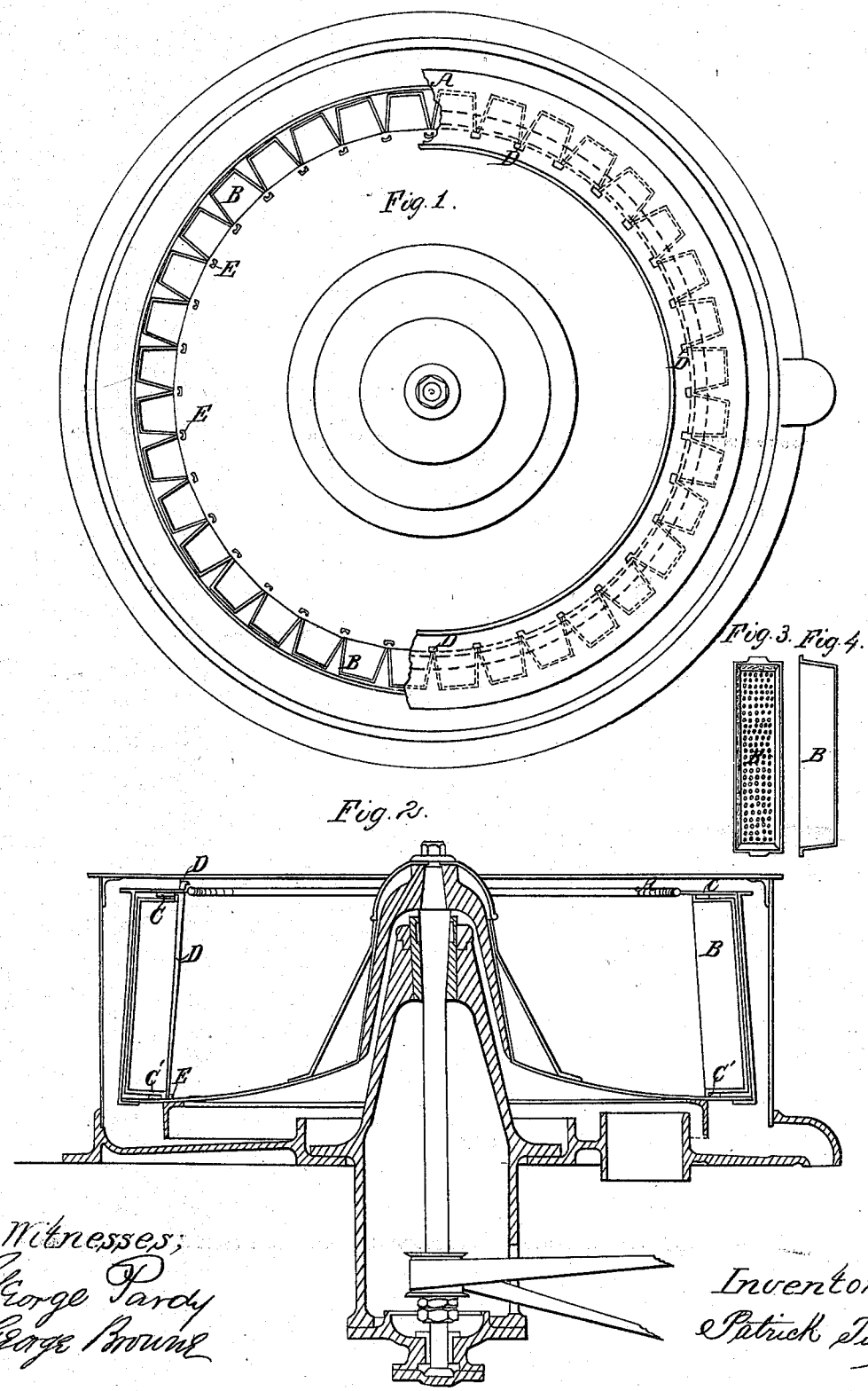

PATRICK TULLY, OF SAN FRANCISCO, CALIFORNIA.

IMPROVED CENTRIFUGAL SUGAR DRAINING AND MOLDING MACHINE.

Specification forming part of Letters Patent No. 105,520, dated July 19, 1870.

*To all whom it may concern:*

Be it known that I, PATRICK TULLY, of the city and county of San Francisco, State of California, have invented a certain new Improvement in Sugar-Drying Centrifugal Machines; and I do hereby declare that the following is a full, clear, and exact description of the same, reference being had to the accompanying drawing, and letters of reference marked thereon, in which—

Figure 1 is a plan. Fig. 2 is a sectional elevation. Figs. 3 and 4 are detail views of my molds which embody the improvement.

The invention has for its object the saving of part of the time and labor required to mold the sugar into cakes by what is to me known as the "Spreckles" process. In this process the sugar is dried in the centrifugal machines in common manner, and afterward the sugar is "scooped" out of the "basket." From a loose pile the sugar is filled into molds, which are then passed under a press, and the sugar in the mold is compressed into a solid cake.

Now, I propose to set a series of somewhat similar molds around the periphery of the revolving basket in such a manner so that, as the basket revolves, the centrifugal force will drive the sugar into the molds, expressing all the molasses and moisture through the perforations both in the bottoms and sides of the molds and in the sides of the basket, leaving the comparatively dry sugar compactly molded into cakes without further process.

To enable others skilled in the art to make and use my invention, I will proceed to describe it as follows:

The "basket" of the common style of centrifugal mill will not need material alteration to adapt it for my improvement, excepting that it may be given increased strength by additional bracing, or by using heavier metal in the rim, for it will be seen that the increased weight of the basket, when fitted with the molds I propose, will give an increase of centrifugal force when the basket is made to revolve at a high rate of speed; hence, it is desirable that the parts should be made amply strong, that they may withstand the increased strain to be applied. Within this revolving basket A, at its periphery, my molds B will be set side by side and close together, as shown in Fig. 1 of the drawing.

The molds, for durability, should be made of sheet-copper, perforated with a sufficient number of small holes. The molds may, however, be made of wood, which may be lined with Russia iron. The molds, when made of copper, must be neatly finished inside, and all of them must weigh exactly alike; otherwise an unsteady motion will be imparted to the revolving basket if it is not truly balanced.

The upper and lower edge of the molds will have a lip turned over (see Fig. 3) for the full breadth of the mold, or for only part its breadth, as desired. Perhaps, to save as much weight as possible, it would be better to make the lips narrow, or about as shown in the drawing.

The upper and lower lips of each mold will catch and bear against the iron rings C C', which are riveted inside the rim and upon the bottom of the basket, as shown. Thus the molds will be prevented from forcing themselves against the sides of the basket. The molds will be held by the keys D, which will pass through the holes in the rim of the basket and set into the sockets E provided for them on the bottom of the basket. Each key will hold two molds, and will be made of "half-round" iron. They may be either straight or slightly tapering edgewise, as desired.

To facilitate the drawing out of these keys, a sliding section will be provided in the "curb" or outside casing of the machine, similar to the common sliding door of the "house stove." As each key is set or withdrawn, it will be necessary to bring it opposite this opening in the curb.

The operation will be simple and as follows: A set of molds will be placed in the basket and all the keys properly adjusted. The charge of sugar is then introduced, and the machine is "started up." The basket revolves with great rapidity, and the sugar, by the centrifugal force generated, is thrown into the molds. The molasses finds a passage through the perforations in the molds and in the basket, leaving the sugar crystals comparatively clear and dry. The usual washing with water is not omitted. After the sugar is sufficiently purified in this manner the machine is stopped, and the molds are removed by withdrawing the keys, and an extra set of molds takes their place, and the operation is again repeated.

As each set of molds is withdrawn the sugar "cakes" or "blocks" are knocked out of them and taken to the drying room, where they are hardened in usual manner.

What I claim as my invention, and desire to secure by Letters Patent, is as follows:

1. The molds set around the basket, for the purposes as described, and constructed in the manner substantially as set forth.

2. The upper and lower rings fastened to and forming part of the "basket," and against which the molds will rest, for the purposes as set forth, and constructed in the manner substantially as described.

3. The keys as a means of securing the molds in position, substantially as herein described.

PATRICK TULLY.

Witnesses:
GEORGE PARDY,
GEORGE BROWNE.